(12) United States Patent
Ohta

(10) Patent No.: US 6,714,673 B1
(45) Date of Patent: Mar. 30, 2004

(54) IMAGE PROCESSING METHOD AND APPARATUS, AND RECORDING MEDIUM THEREFOR

(75) Inventor: Ken-ichi Ohta, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 611 days.

(21) Appl. No.: 09/660,140

(22) Filed: Sep. 12, 2000

(30) Foreign Application Priority Data

Sep. 17, 1999 (JP) ............................................. 11-263915

(51) Int. Cl.[7] ................................................. G06K 9/00
(52) U.S. Cl. ...................... 382/167; 382/169; 382/274; 358/1.9; 358/461
(58) Field of Search ................................ 382/312, 167, 382/169, 162, 274; 358/501, 519, 521, 504, 406, 523, 518, 520, 1.9, 461

(56) References Cited

U.S. PATENT DOCUMENTS

| | | | | |
|---|---|---|---|---|
| 4,977,448 A | * | 12/1990 | Murata et al. | 358/530 |
| 5,463,473 A | | 10/1995 | Yamada et al. | 358/300 |
| 5,467,196 A | * | 11/1995 | Fukushima et al. | 358/3.15 |
| 5,585,927 A | * | 12/1996 | Fukui et al. | 358/518 |
| 5,835,243 A | | 11/1998 | Mori | 358/518 |
| 5,982,947 A | | 11/1999 | Hayashi | 382/274 |
| 6,055,071 A | * | 4/2000 | Kuwata et al. | 358/501 |
| 6,094,502 A | * | 7/2000 | Hirata et al. | 382/167 |

FOREIGN PATENT DOCUMENTS

| | | | | |
|---|---|---|---|---|
| JP | 3-208681 | 9/1991 | | B41J/2/52 |
| JP | 77-333930 | 12/1995 | | G03G/15/00 |
| JP | 9-107476 | 4/1997 | | H04N/1/407 |

* cited by examiner

Primary Examiner—Bhavesh M. Mehta
Assistant Examiner—Ali Bayat
(74) Attorney, Agent, or Firm—Fitzpatrick, Cella, Harper & Scinto

(57) ABSTRACT

An image to be output as a solidly filled image can be reproduced satisfactorily. An image processing method includes the steps of inputting data obtained by reading a patch pattern formed by an image forming apparatus; and creating correction conditions for the image forming apparatus on the basis of the data, wherein the correction conditions are created based on the data so that output image data with respect to a specific gradation level of multi-level gradation input image data satisfy preset conditions.

8 Claims, 13 Drawing Sheets

FIG. 2
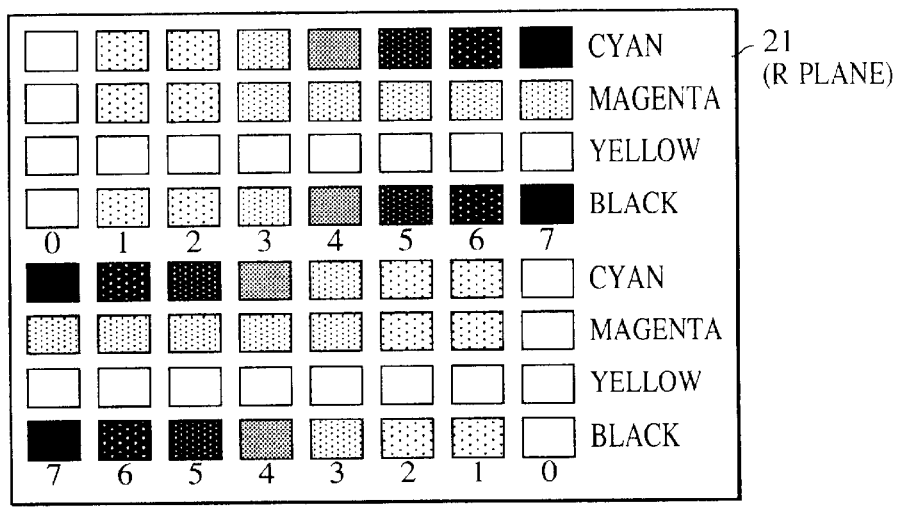
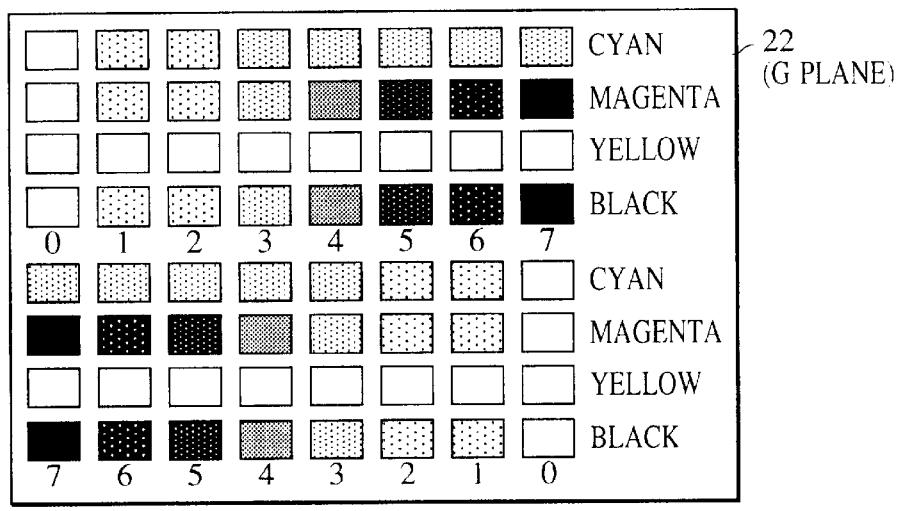
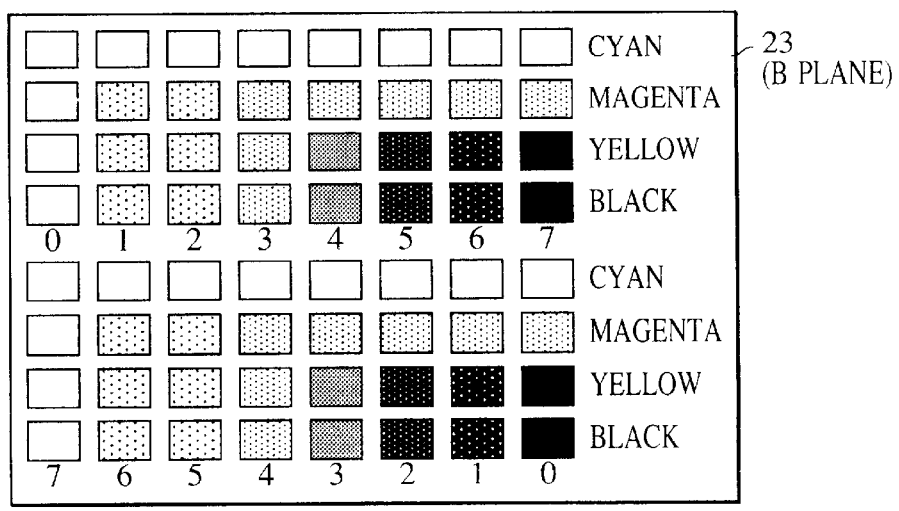

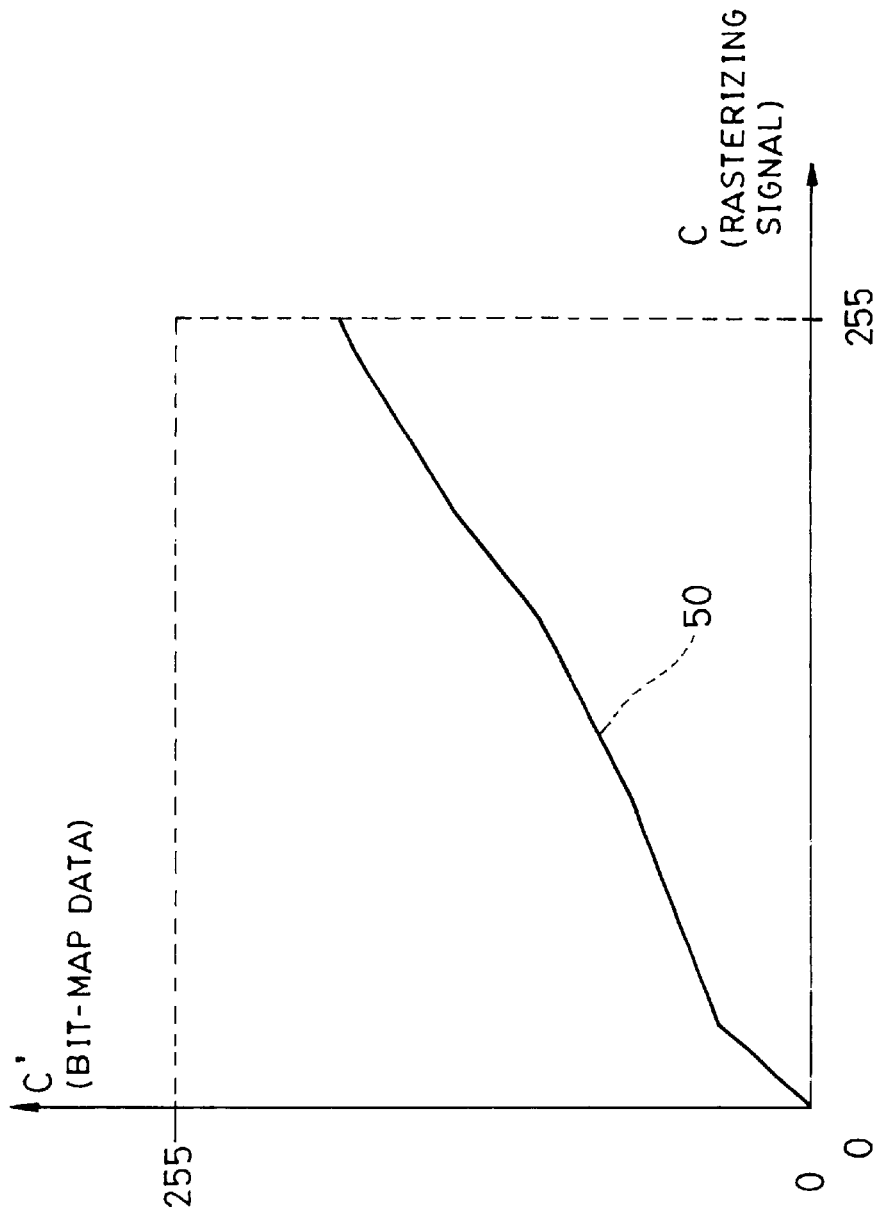

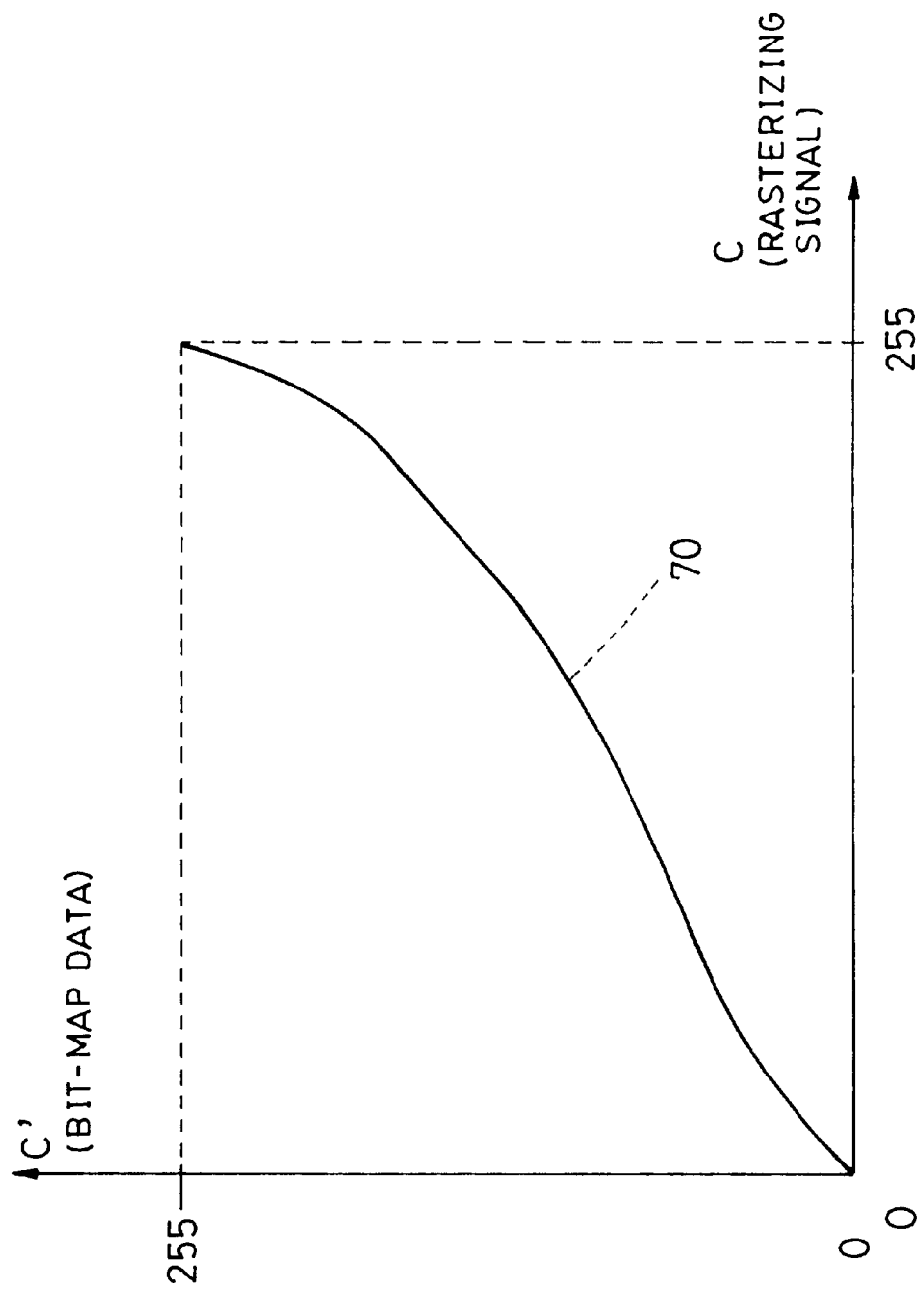

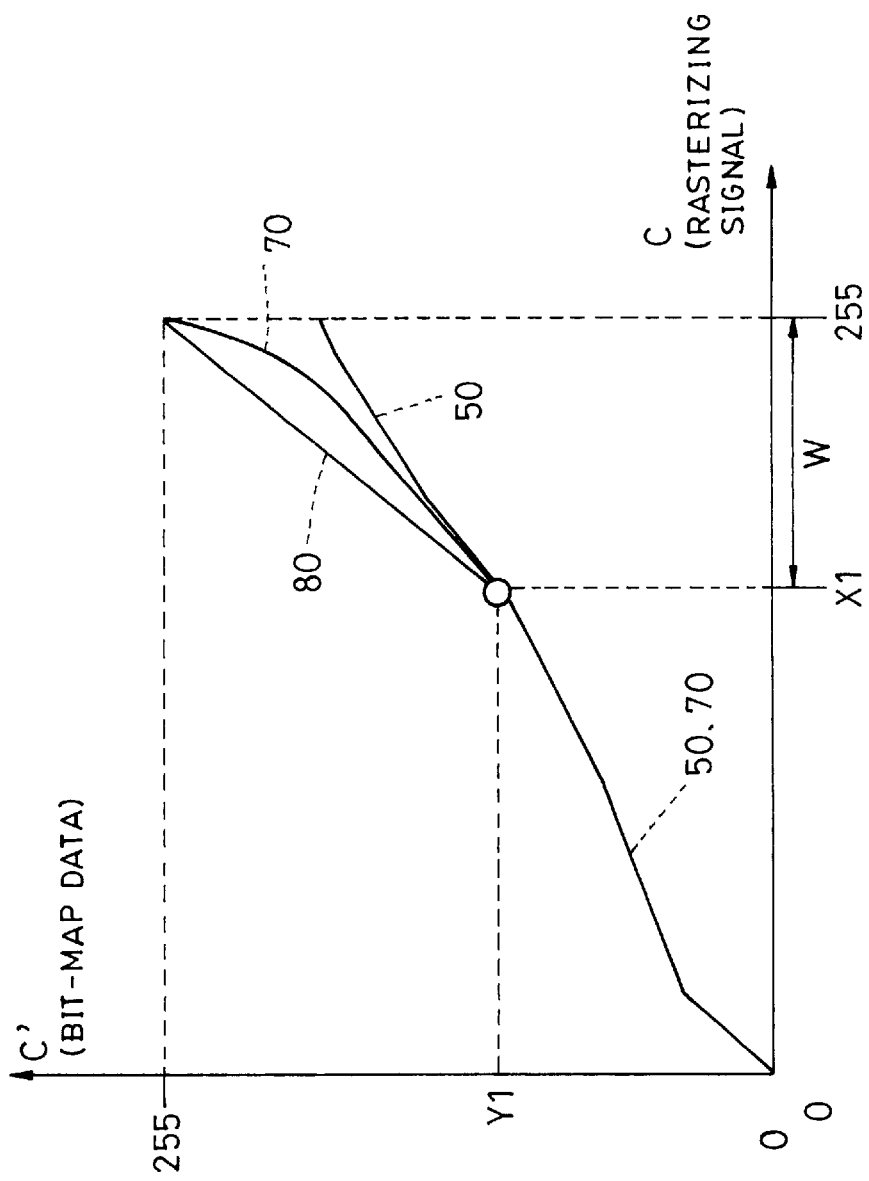

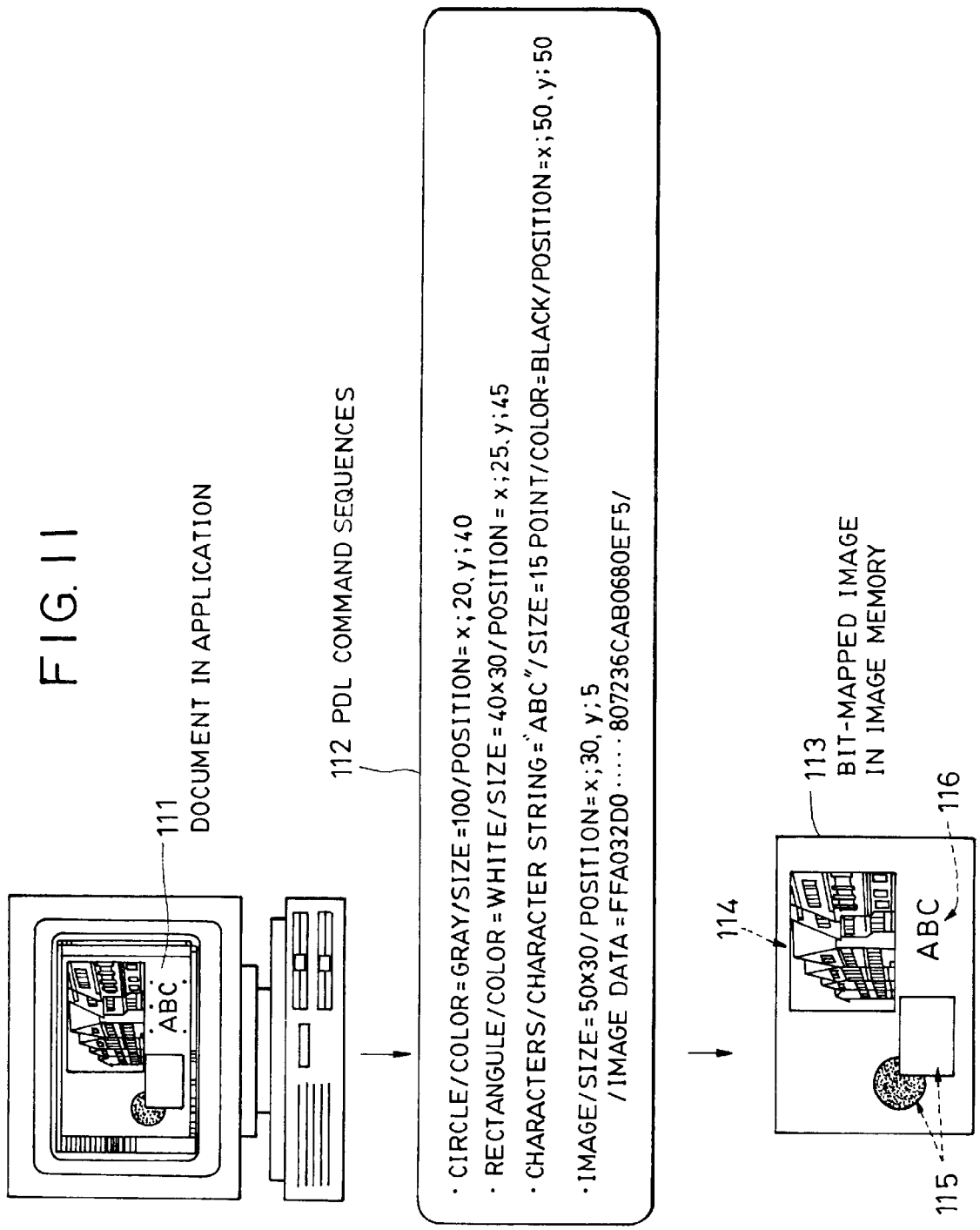

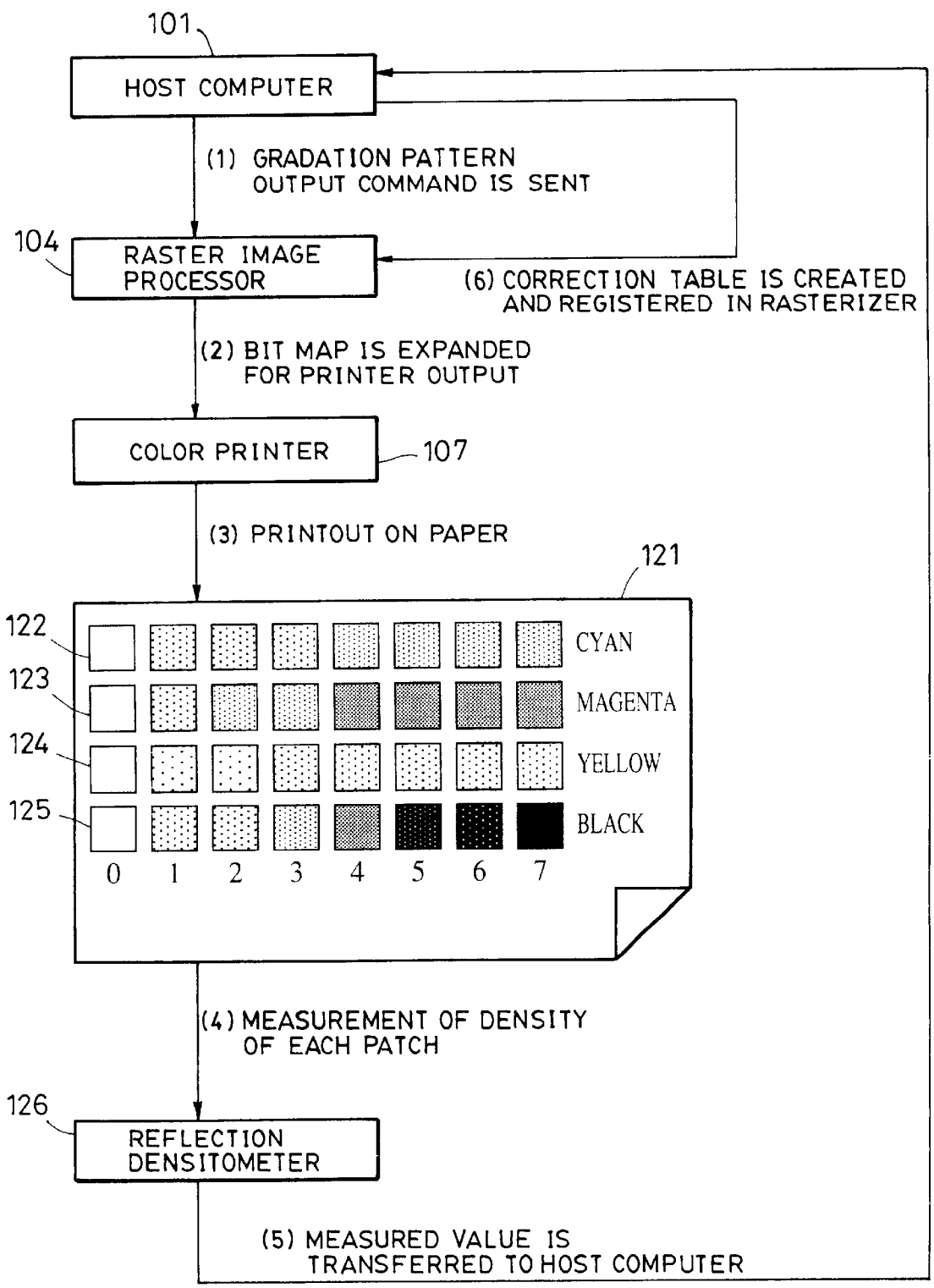

IMAGE PROCESSING METHOD AND APPARATUS, AND RECORDING MEDIUM THEREFOR

BACKGROUND OF THE INVENTION

1. Field of the Invention

The present invention relates to an image processing method and to an image processing apparatus for stabilizing output characteristics of an output apparatus, and to a recording medium therefor.

2. Description of the Related Art

In recent years, various types of peripheral apparatuses, such as personal computers and printers, have become popular, and anyone can easily produce hardcopy output of word-processor documents and graphic images produced by a computer. As a representative construction thereof, an image processing system such as that shown in FIG. 10 is known.

FIG. 10 shows an outline of a construction of a system which produces a page layout document such as DTP, and word-processor and graphic documents by using a host computer 101 and which produces hardcopy output by a laser printer, an ink jet printer, etc.

Reference number 102 denotes an application which operates in a host computer. Representative well known examples are word processor software such as MS Word (trademark) of Microsoft Corporation, and page layout software such as PageMaker (trademark) of Adobe Systems Incorporated.

A digital document produced by this software is passed to a printer driver 103 via an operating system (OS) of a computer (not shown).

The digital document is usually expressed as a set of command data representing figures and characters which constitute one page, and these commands are sent to the printer driver 103. The series of commands forming the screen are expressed as a language system called "PDL (Page Description Language)". Representative well known examples of PDL are GDI (Graphics Device Interface) (trademark) and PS (PostScript) (trademark).

The printer driver 103 transfers the received PDL command to a rasterizer 105 inside a raster image processor 104. The rasterizer 105 forms the characters, figures, etc., expressed by PDL commands, into a two-dimensional bit-mapped image, performs a gradation correction process on each pixel by using a look-up table, and performs a quantization process, such as a dithering process. Since the bit-mapped image is an image in which a two-dimensional plane is filled with a repetition of a one-dimensional raster (line), the rasterizer 105 is called a "rasterizer". The expanded bit-mapped image is temporarily stored in an image memory 106.

The above operation is schematically shown in FIG. 11. A document image 111 displayed on the host computer is sent, as a PDL command sequence 112, to the rasterizer via the printer driver. The rasterizer expands the two-dimensional bit-mapped image onto the image memory, as indicated by reference numeral 113.

The expanded image data is sent to a color printer 107. In the color printer 107, an image forming unit 108 employing a well-known electrophotographic method or ink-jet recording method is used, and by using this, a visible image is formed on paper and a printout is produced. It is a matter of course that the image data in the image memory is transferred in synchronization with a synchronization signal (not shown), a clock signal (not shown), or a transfer request (not shown) of a specific color-component signal, which is required to operate the image forming unit.

In the conventional technology such as that described above, when an image forming unit used for output is considered, it is clear that various problems will occur.

The problems arise from instability of image output characteristics of the image forming unit and from variations among apparatuses, and in output images of the same original document, hue changes each time an output is made or differs when the output is made by a different printer.

This occurs due to the following reasons. For example, when an electrophotographic method is used in the image forming unit, steps, such as laser exposure, latent-image formation on a photosensitive body, toner development, toner transfer onto a paper medium, and fixing by heat, in the electrophotographic process are affected by environmental temperature and humidity or by factors such as aging of components, and the amount of toner which is finally fixed onto the paper changes for each situation.

Such instability is not characteristic of the electrophotographic method, and it is known that such instability occurs in a similar manner even in an ink-jet recording method, a heat-sensitive transfer method, and various other methods.

In order to overcome such problems, conventionally, a system shown in FIG. 12 is conceived. This is designed to output a test pattern image, such as that indicated by reference numeral 121, from the printer 107, to measure the density of the output pattern, and to correct the characteristics of the image forming unit. In this system, a look-up table which is used in a gradation correction process performed by the rasterizer 105 is created.

The operations at this time are described below step by step.

Initially, the host computer 101 sends a command for outputting a predetermined gradation pattern to the raster image processor 104. The raster image processor 104 generates a bit-mapped pattern for printer output on the basis of the sent command and transfers it to the printer section 107. The printer section 107 outputs the supplied bit-mapped pattern on a paper medium. Here, for the output pattern, it is assumed that a pattern is output such that a toner adherence area ratio changes in eight steps from 0% to 100% with respect to cyan (C), magenta (M), yellow (Y), and black (K) corresponding to a four-color toner of a printer as indicated by the test pattern image 121. In FIG. 12, each of the eight steps is given a number from 0 to 7, and the gradation pattern of each color is such that a horizontal row of reference numeral 122 is for C, a horizontal row of reference numeral 123 is for M, a horizontal row of reference numeral 124 is for Y, and a horizontal row of reference numeral 125 is for K.

In the output pattern, there are a total of 32 rectangular printing areas (patch areas) in 4 colors×8 steps, and each of the areas is measured by using a reflection densitometer 126. The measured value (the density value of each patch) is sent to the host computer.

The host computer compares the measured value with a prestored reference value, creates a correction table for each of the colors C, M, Y, and K, and registers this table in a table conversion section of the raster image processor. The table conversion section corrects a value which is written as bit-mapped data when the raster image processor creates a bit-mapped image.

For example, in a case where the density of the third patch of cyan in the test pattern 121 is measured lower than the reference value, in the correction table, by correcting the bit-mapped data corresponding to the third patch of cyan to a high value, the density characteristics of the printer can be brought closer to the reference value.

This state is shown in FIGS. 13A and 13B. FIG. 13A shows that the density value obtained for a cyan patch is plotted with respect to the gradation number of the patch. FIG. 13B shows a correction table which is created based on this measured value.

In FIG. 13A, the horizontal axis indicates a gradation number, the vertical axis indicates a measured value, ∘ marks 131 each indicate a measured value, and a curve 132 connects the measured values by straight lines.

The gradation number along the horizontal axis is considered here. This is equivalent to that signal values to be output to the printer which is an image forming unit are sampled at predetermined intervals and are assigned numbers. A conventional printer unit is capable of image output at the number of gradations formed of eight bits for each of C, M, Y, and K, and forms and outputs an image having continuous gradations on paper by using a binarization process using a well-known dithering process according to the level of each signal value.

In the embodiment described here, since patches of 0 to 7 are output by signal values in which an 8-bit signal of 0 to 255 are divided evenly, the horizontal axis of FIG. 13 directly shows signal values for forming an image by the printer, and the following correspondence is satisfied:

Gradation No. 0=Printer output signal value 0
Gradation No. 1=Printer output signal value 36
Gradation No. 2=Printer output signal value 73
Gradation No. 3=Printer output signal value 109
Gradation No. 4=Printer output signal value 146
Gradation No. 5=Printer output signal value 182
Gradation No. 6=Printer output signal value 219
Gradation No. 7=Printer output signal value 255

A thick line 133 in FIG. 13 shows an example of ideal density characteristics which should be taken by the density value of the output patch with respect to the signal value which is output by the printer. That is, it is preferable that the printer have density characteristics which are proportional to the output signal value and which reach a predetermined maximum density value (1.6 in the figure) when the output signal value is at a maximum (255). However, the printer has density characteristics such as those indicated by a curve 132 in FIG. 13A due to variations in individual printers and due to environmental variations.

Accordingly, when a bit-mapped image of the printer output signal values of C, M, Y, and K is created by rasterizing PDL commands, the raster image processor may obtain bit-mapped data by correcting the C, M, Y, and K values by using a predetermined look-up table.

This look-up table may be a table having characteristics inverse to those of the curve 132 in FIG. 13A. The host computer computes a conversion table having such characteristics for each of C, M, Y, and K on the basis of the measured density value and transfers it to the raster image processor.

A curve 134 in FIG. 13B shows that an actual conversion table is plotted, and has characteristics inverse to those of the curve 132 in FIG. 13A, that is, characteristics such that the curve 132 is folded symmetrically with respect to a straight line 133. The curve 134 is formed of an ordinary look-up table, and the rasterizer uses a signal value (here, a signal C) after rasterization as an input signal for the look-up table and uses the output value of the look-up table as a signal value (here, a signal C') to be written into the bit-mapped data.

In a case where the image forming unit can produce output only by binary values of "on" and "off", a well-known pseudo-halftone process, such as a dithering process, is further performed on the signal C', after which the signal is written into the bit-map memory.

Here, the characteristics of the curve 134 show that the output signal value when the input signal has a value 255, is smaller than 255, as indicated by a point 135. The reason for this is that, at the curve 132 in FIG. 13A, the values of Dc6 and Dc7 are larger than the expected maximum density value.

Therefore, when an output apparatus having such density characteristics is used, the signal C' after gradation correction does not become 255. Here, when the output signal value to the printer is 0, a toner or ink image is not formed and the output image becomes white. When the output signal value is 255, a solidly filled image is formed by toner or ink, and the output image becomes black (or solidly filled areas of cyan, magenta, etc.). However, since the signal value after gradation correction does not become 255, as a result of this value being subjected to a dithering process, the toner or ink formation signal after the dithering process is converted into a pattern in which 0 and 1 occur alternately, making it impossible to form a solidly filled image on a printout.

For example, when a solidly filled thin line is reproduced, the thin line in the output image may be broken.

SUMMARY OF THE INVENTION

The present invention has been achieved in view of the above-described points. An object of the present invention is to satisfactorily reproduce an image which should be output as a solidly filled image.

Another object of the present invention is to easily create correction conditions having different reproducibilities.

To achieve the above-mentioned objects, according to one aspect of the present invention, there is provided an image processing method comprising the steps of inputting data obtained by reading a patch pattern formed by an image forming apparatus; and creating correction conditions for the image forming apparatus on the basis of the data, wherein the correction conditions are created based on the data so that output image data with respect to a specific gradation level of multi-level gradation input image data satisfy preset conditions.

According to another aspect of the present invention, there is provided an image processing method comprising the steps of inputting data obtained by reading a patch pattern formed by an image forming apparatus; and creating correction conditions for the image forming apparatus on the basis of the data, wherein a plurality of methods of creating the correction conditions are provided, and the respective methods realize different reproducibilities.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is an illustration of read data of gradation patterns.

FIG. 5 shows an example of a look-up table;

FIG. 7 shows an example of a corrected look-up table;

FIG. 8 illustrates a method of correcting a look-up table;

FIG. 11 illustrates a general operation of the image processing system;

FIG. 12 illustrates a conventional image processing system; and

DETAILED DESCRIPTION OF THE PREFERRED EMBODIMENTS

Embodiments of the present invention are described below with reference to the accompanying drawings.

(First Embodiment)

Figure 1:
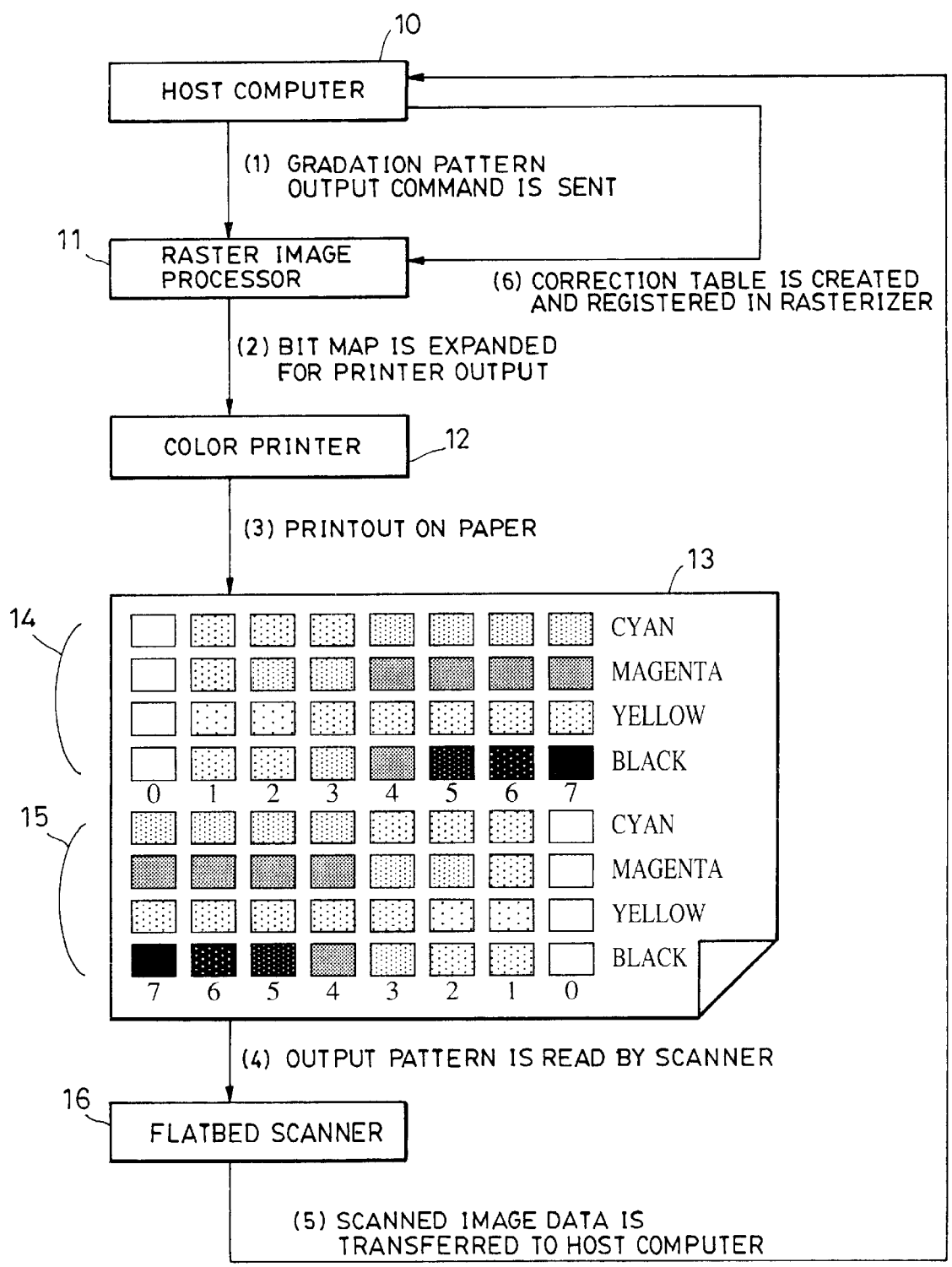
FIG. 1 shows an example of a system configuration.
Figure 10:
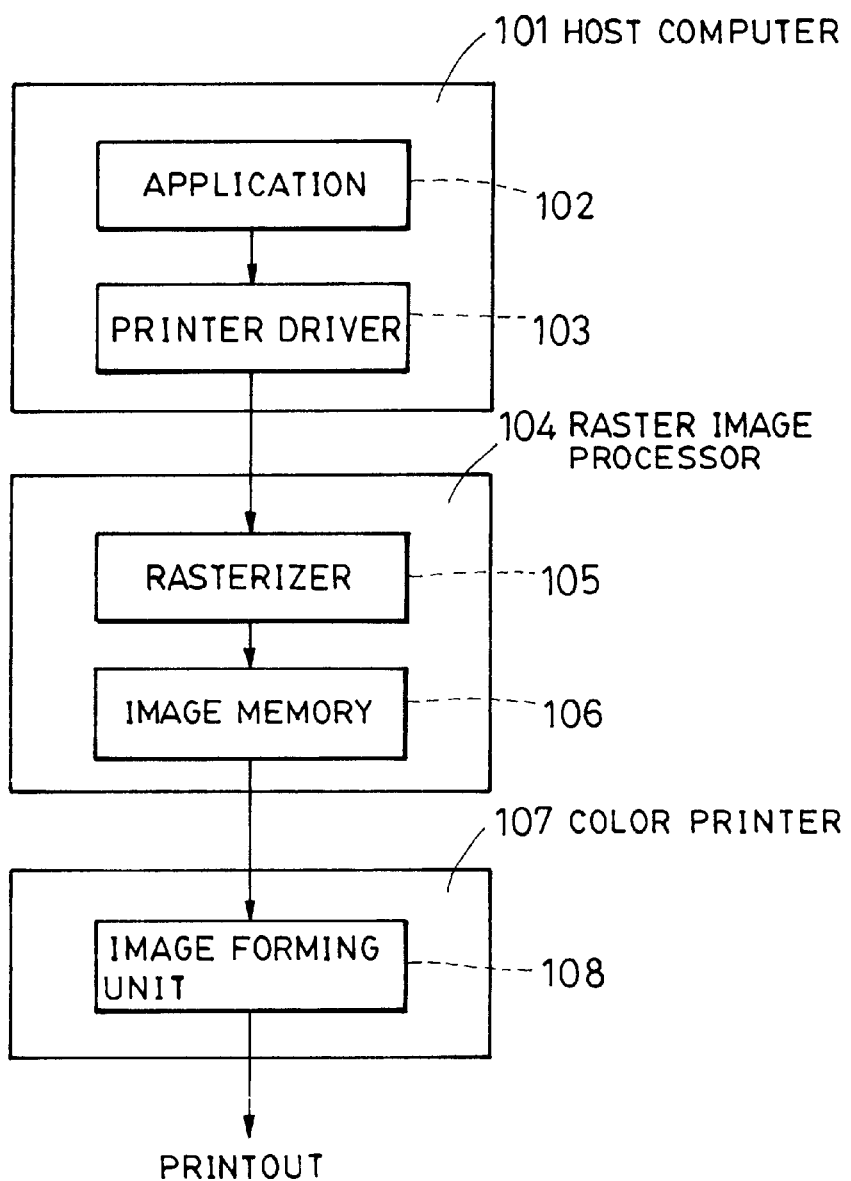
FIG. 10 shows a general example of an image processing system.

FIG. 1 is a block diagram showing an example of an image processing system according to a first embodiment of the present invention. Components 10, 11, and 12 in FIG. 1 are the same as components 101, 104, and 107 in FIG. 10, respectively.

In this embodiment, by using the system of FIG. 1, a look-up table corresponding to each color used in a gradation correction process performed by a raster image processor when an image is output by a color printer is created.

The procedure until a gradation pattern is printed out from a host computer is the same as that of the conventional technology described with reference to FIG. 12. When the gradation pattern is printed out, the gradation correction process is not performed.

A pattern which is output in this embodiment differs from that of FIG. 12 as shown by a pattern 13. That is, the upper half pattern 14 is the same as a pattern of 122 to 125 in FIG. 12, and furthermore, a pattern in which the upper half pattern 14 is laterally inverted is output as shown by a lower half pattern 15. This is for overcoming density variations of a printer and reading characteristic variations of a scanner, as will be described later.

The output gradation pattern 13 is placed directly on a document holder glass of a flatbed scanner 16, and an operation of reading the image data of the entire pattern is performed in accordance with a reading instruction (not shown) from a host computer 10.

The read image data is transferred to the host computer. The host computer analyzes this image data in order to determine the density value of each patch, creates a correction table on the basis of the obtained density value, and registers it in a raster image processor.

Thereafter, when a command indicating an output image is input from the host computer, a raster image processor 11 performs gradation correction by using the created correction table, performs a quantization process such as a dithering process, and outputs the data to a color printer 12.

The foregoing correction table creation procedure is described in more detail. The procedure described below is executed by software in the host computer by using the read image data. Here, the operation of software on the OS and a detailed control structure thereof are omitted, and only the basic operations thereof are described.

The image data obtained by reading the entire surface of output paper by the flatbed scanner is a bit-mapped image which is separated into the three colors of R, G, and B, as shown in FIG. 2, and this is transferred to the host computer. FIG. 2 is a schematic representation of this bit-mapped data, in which reference numeral 21 denotes an R plane, reference numeral 22 denotes a G plane, and reference numeral 23 denotes a B plane.

White areas in FIG. 2 indicate areas in which the read signal value is large, that is, bright (the density is low), and black areas indicate areas in which the signal value is low, that is, the density is high. As is clear from the figure, in the R plane, the high-density portions of the cyan and black patches are read correctly as high-density areas, in the G plane, the magenta and black patches are read, and in the B plane, the yellow and black patches are read.

Therefore, in order to measure the density of the cyan patch, data of the R plane may be used. Also, to measure the density of the magenta patch, data of the G plane may be used, and to measure the density of the yellow patch, data of the B plane may be used. Although the density of the black patch may be measured by any one of the R, G, and B planes, here, data of the G plane is used.

Therefore, as a representative example, the procedure of cyan patch density measurement is described next.

Figure 3:
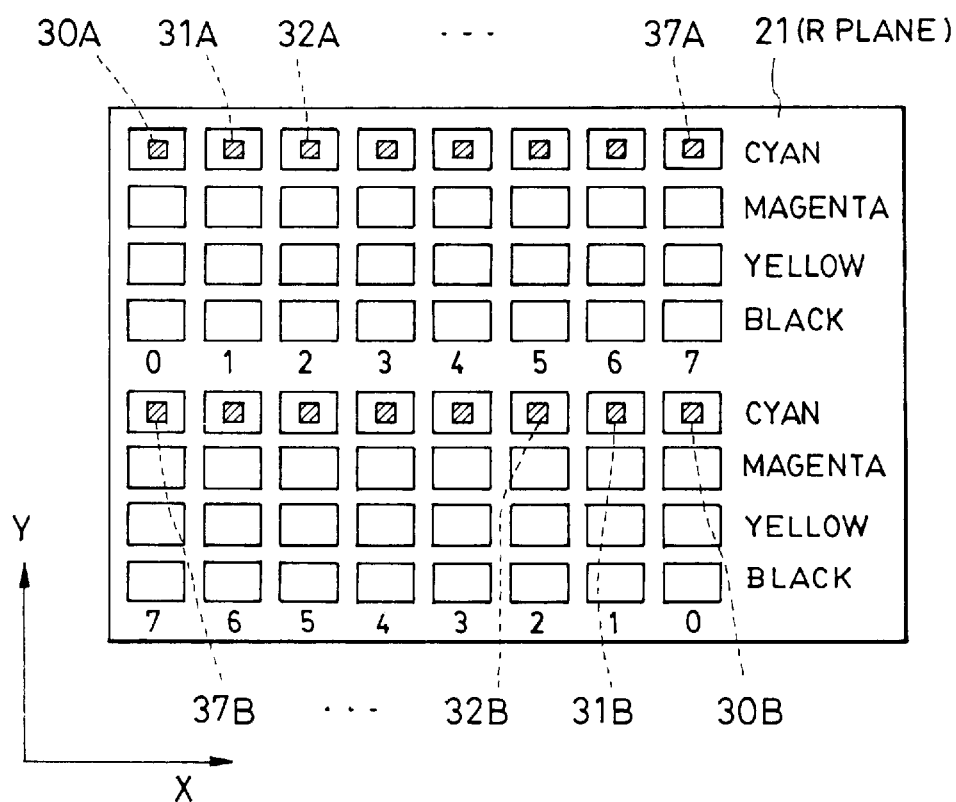
FIG. 3 illustrates the cutout of a gradation patch from the read data.

FIG. 3 shows read image data of the R plane, which is the same as the R plane 21 in FIG. 2, in which only rectangles indicating the position of each patch are shown, and the brightness of the patch is omitted.

The image data, as shown in FIG. 3, is a collection of pixel values, which are arranged in a matrix on the two-dimensional coordinates of x, y, and the position and the size of each patch can be specified by the coordinate values of x, y. Since the x, y coordinates are determined by a gradation patch output command from the host computer, the coordinate values may be stored in advance so as to correspond to the patch output command, so that the stored coordinate values are read therefrom.

The density value is then determined based on the position coordinate information of the cyan patch, and the procedure thereof is described below.

Initially, an image cutout area 30A (inside of the rectangle indicated by the shaded area) is determined on the basis of the position coordinates of a patch (gradation number 0) having the lowest density at the left end from the cyan patch sequence of the upper portion, and the image data S(x, y) inside the rectangle is read. Since S(x, y) is usually expressed as a digital signal of 8 bits or so, a description is given here assuming that they are integers of 0 to 255.

S(x, y) is a collection of image data within the area 30A, and the total number thereof is determined by the number of pixels contained within the rectangular area 30A. If the number of pixels in the x direction of the rectangular area is denoted as Nx and the number of pixels in the y direction as Ny, the total number of S(x, y) is Nx*Ny.

Next, the average value Sm of the pixel values within the area 30A is determined. This can be determined by the following equation:

$$Sm = (\Sigma S(x, y))/(Nx*Ny) \quad (1)$$

where $\Sigma$ indicates the summation of the data within the rectangular area 30A. The obtained average value Sm is denoted as Sc0A by considering it to be an average value of the pixel data of gradation number 0 of the cyan patch sequence of the upper portion.

Then, the processing is performed for the second patch of cyan. In a manner similar to that described above, a rectangular area 31A is determined on the basis of the patch position coordinate information, and an average value Sc1A of the pixel data is determined by the same procedure.

Hereafter, in a similar manner, the processing is performed for rectangular areas 32A, 33A, ..., 37A in sequence, and average value data Sc2A, Sc3A, ..., Sc7A are determined.

When the above operations are terminated, the processing is performed for the cyan patch of the lower portion, and this time, conversely, a rectangular area 30B is determined from the patch of the right end, and an average value of the pixel data is determined. Since the rightmost end corresponds to gradation number 0 in the lower portion, this average value is denoted as Sc0B.

For the lower portion, in a similar manner, an average value is determined for each of areas 31B, 32B, ..., 37B, and this is denoted as SC1B, Sc2B, ..., Sc7B.

Here, since the same gradation levels are reproduced in the patches 30A and 30B, in the patches 31A and 31B, ..., and in patches 37A and 37B, if there are no density variations due to the output position of the printer section or if there are no read value variations due to the reading position of the scanner pattern, basically, the obtained average value data become equal. That is, the following should be satisfied:

$$Sc0A = Sc0B \qquad (2)$$

$$Sc1A = Sc1B$$

$$\vdots$$

$$Sc7A = Sc7B$$

In practice, however, they do not always become equal due to various variation factors. Accordingly, in this embodiment, in a state in which equation (2) does not always hold, processing is performed assuming that the average value of the two is a true patch read value.

More specifically, assuming that Sc0, Sc1, ..., Sc7 are true patch data, the following are set:

$$Sc0 = (Sc0A + Sc0B)/2 \qquad (3)$$

$$Sc1 = (Sc1A + Sc1B)/2$$

$$\vdots$$

$$Sc7 = (Sc7A + Sc7B)/2$$

As a result of the above, when the average image signal of each patch is determined, then, these are converted into density values. Image data read by a scanner is usually what is commonly called a luminance signal which is proportional to the reflectance of the original document. In order to convert this signal into a density value, an appropriate logarithm conversion process must be performed thereon. As an example of a conversion equation for expressing a density value D also as an 8-bit integer, the following may be used:

$$D = -255 * \log 10(S/255)/1.6 \qquad (4)$$

This is an equation for converting the luminance signal S so that D=255 when the document density is 1.6, and when D becomes more than 255, D is limited to 255.

By using this equation (4), the average values Sc0, Sc1, ..., Sc7 obtained based on equation (3) are converted into density values Dc0, Dc1, ..., Dc7. That is, $$Dc0 = -255 * \log 10 \ (Sc0/255)/1.6 \qquad (5)$$

$$Dc1 = -255 * \log 10 \ (Sc1/255)/1.6$$

$$\vdots$$

$$Dc7 = -255 * \log 10 \ (Sc7/255)/1.6$$

The density values for the other color patches of magenta, yellow, and black can be determined by the same procedure. The density values obtained in this manner are denoted as Dm0 to Dm7, Dy0 to Dy7, and Dk0 to Dk7, respectively.

Here, conversion into density values is not limited to equation (5), and other conversion equations may be used. It is also possible to measure and determine the relationship between the luminance signal values and the density values in advance, and to use this relationship, as a look-up table, for density conversion.

Figure 4:
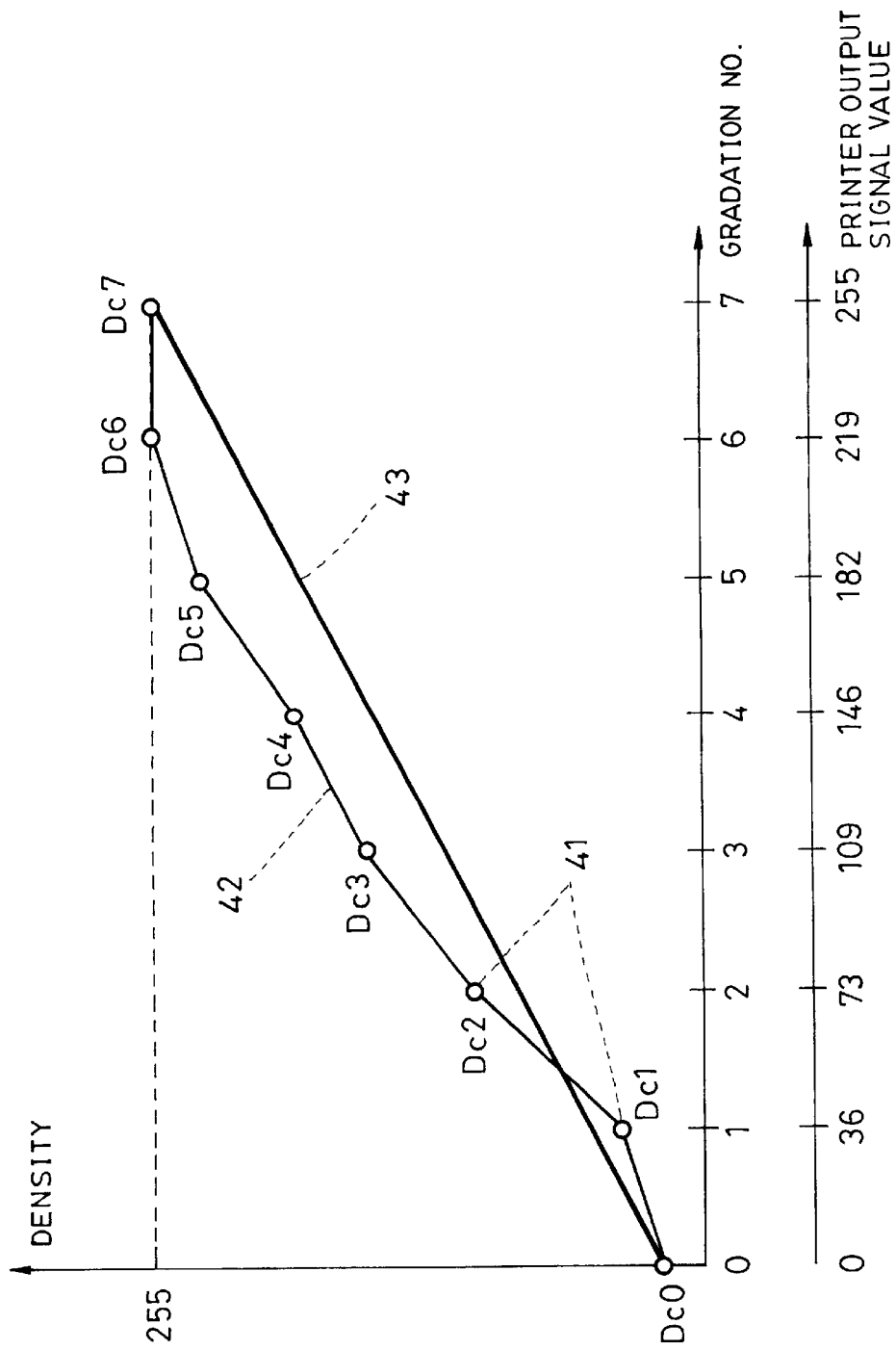
FIG. 4 illustrates measured density characteristics.

FIG. 4 shows that the density values obtained for the cyan patch are plotted with respect to gradation numbers of the patch. The horizontal axis indicates a gradation number, the vertical axis indicates a measured value, ○ marks 41 each indicate a measured value, and a curve 42 connects the measured values by straight lines. Although FIG. 4 is basically the same as FIG. 13A, the measured values are not density values, but density conversion values obtained based on equation (4).

Figure 13A:
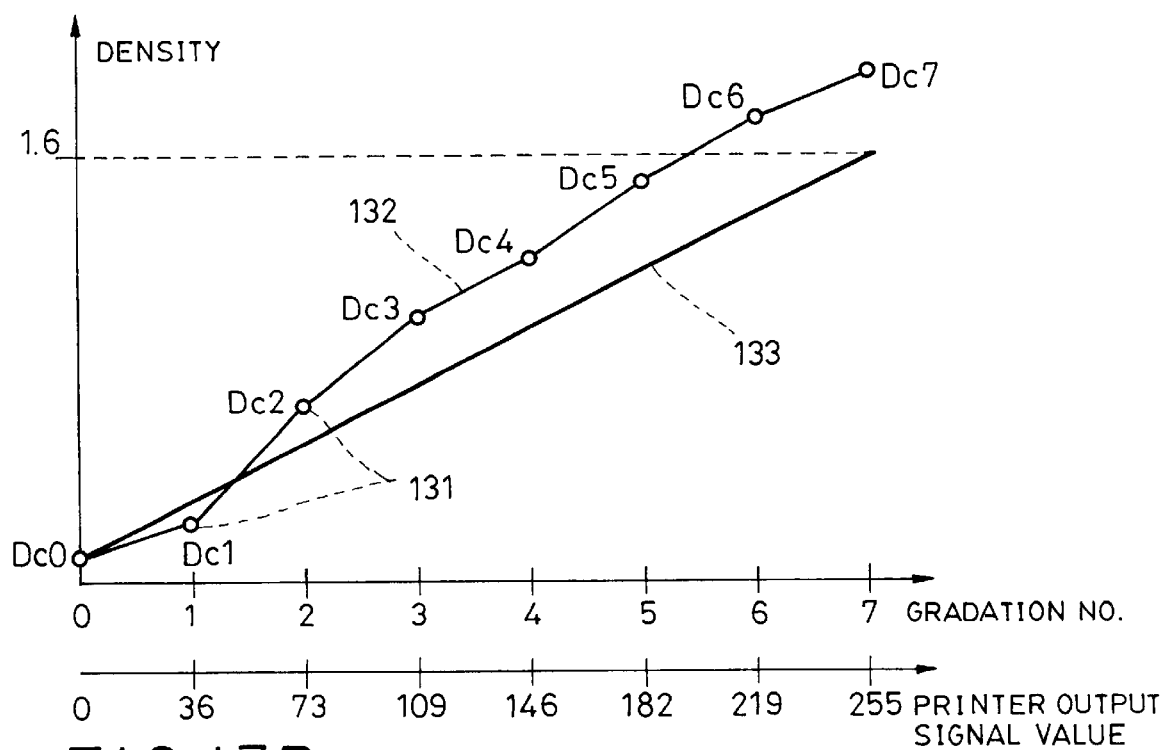
FIGS. 13A and 13B show an example of a gradation correction table created by the conventional system.
Figure 13B:
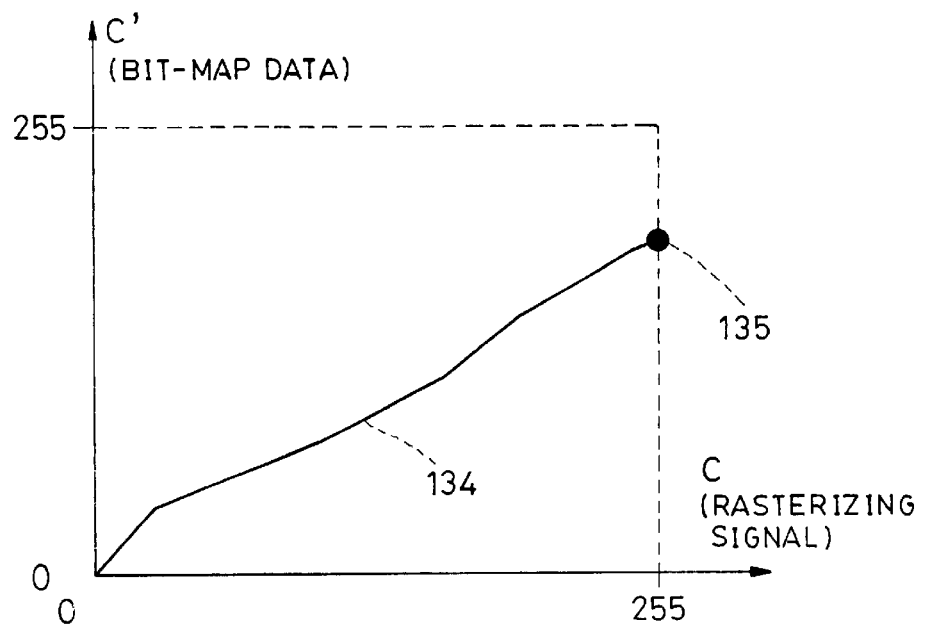

The meaning of the horizontal axis is as described in FIG. 13A, and the following correspondence is satisfied:

Gradation No. 0=Printer output signal value 0
Gradation No. 1=Printer output signal value 36
Gradation No. 2=Printer output signal value 73
Gradation No. 3=Printer output signal value 109
Gradation No. 4=Printer output signal value 146
Gradation No. 5=Printer output signal value 182
Gradation No. 6=Printer output signal value 219
Gradation No. 7=Printer output signal value 255

In a manner similar to FIG. 13A, a thick line 43 in FIG. 4 also shows an example of ideal density characteristics which should be taken by the density values of the output patch with respect to the signal value which is output by the printer. That is, it is preferable that the printer have density characteristics which are proportional to the output signal value and which have a predetermined maximum density value.

The differences herein from FIG. 13A are that, since the measured density values are defined as values 0 to 255 obtained based on equation (4), the value which should originally be more than 255 (that is, the density becomes 1.6 or higher here) is limited to 255 (Dc6 and Dc7 in FIG. 4), and that the maximum density value is normalized so as to become 255 when the density value is 1.6.

Here, the maximum density value is set to 1.6, and based on this, equation (4) is determined. Of course, however, this value is not limited to 1.6.

When a bit-mapped image of printer output signal values of C, M, Y, and K is created by rasterizing the PDL command on the basis of the above measured values, the raster image processor may obtain bit-mapped data by correcting the C, M, Y, and K values by using a predetermined look-up table.

This look-up table may be a table having characteristics inverse to those of the curve 42 of FIG. 4, and the host computer computes a conversion table having such characteristics for each of C, M, Y, and K on the basis of the measured density value and transfers it to the raster image processor.

A curve 50 in FIG. 5 indicates characteristics of an actual correction table, and the characteristics are inverse to the characteristics of the curve 42 in FIG. 4, that is, the curve 42 is laterally folded with respect to the straight line 43. By using this look-up table, the rasterizer converts a signal value (here, a signal C) after rasterization to a signal value (a signal C') to be written into the bit-mapped data.

However, if this state is unchanged, in a manner similar to the conventional technology, even if the rasterized signal value is 255, the signal value after correction does not become 255.

Therefore, in this embodiment, a user interface such as that shown in FIG. 6 is provided on the user operation screen of the host computer which controls the operations which have been described thus far.

Figure 6A:
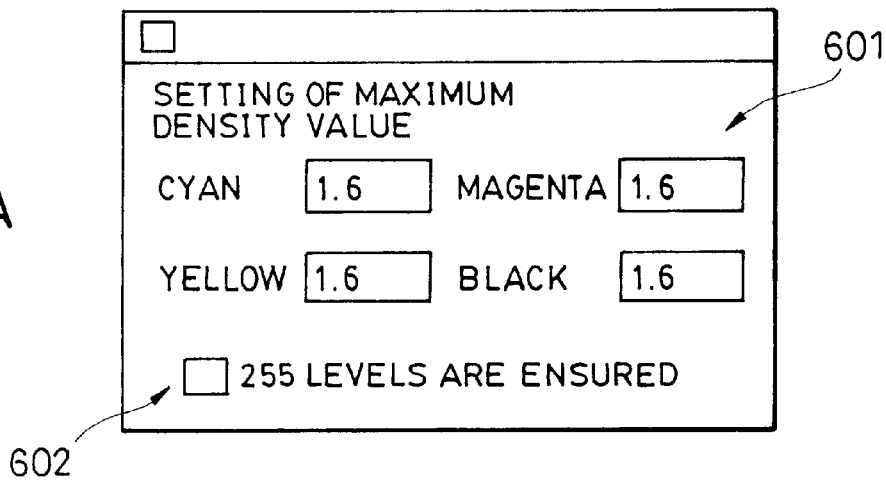
FIGS. 6A and 6B show examples of a user interface.

As shown in FIG. 6A, by providing a text box 601, it is possible for the user to set the maximum density value used in equation (4), and a check box 602 used for setting "255 levels are ensured" is provided.

Figure 6B:
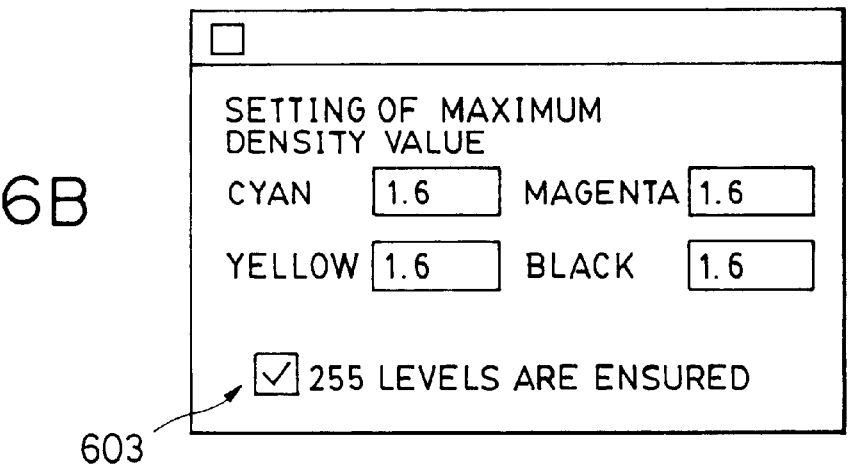

By checking this check box as indicated by reference numeral 603 in FIG. 6B, it is possible to instruct the creation of a correction table. When the box 603 is checked, the correction table is automatically corrected to a curve 70 of FIG. 7 and not to the curve 50 of FIG. 5.

A method of creating the curve 70 is described below by referring to FIG. 8. The curve 50 in FIG. 8 is the same as the curve 50 in FIG. 5.

Here, for the sake of convenience, an input signal of the look-up table is denoted as X, an output signal as Y, the curve 50 as Y=F50 (X), and the curve 70 as Y=F70 (X).

First, as shown in FIG. 8, an anchor point X1 is determined. The anchor point X1 may usually be a value of approximately 160. In this embodiment, the anchor point is set in advance. An output signal value corresponding to the anchor point X1 is denoted as Y1. It is clear in the figure that W=255−X1.

The curves 50 and 70 completely coincide with each other in a range in which X is equal to or less than X1, and F70 (X)=F50 (X).

For the range in which X is greater than X1, F70 (X) is generated by the following procedure.

Initially, an equation (denoted as F80 (X)) corresponding to a straight line, indicated by reference numeral 80, which connects points (X1, Y1) and (255, 255) is determined.

$$F80(X)=Y1+(255-Y1)\times(X-X1)/W$$

The curve 70 is determined by interpolating this F80 (X) and F50 (X) which is the curve 50 on the basis of the following equation:

$$F70(X)=((X-X1)\times F80(X)+(255-X)\times F50(X))/W$$

The curve determined in this manner becomes the curve 70, which touches the curve 50 at the input value X1 and which gradually comes close to a point in which the output becomes 255 when the input is 255.

If gradation correction is performed by using the curve 70 obtained by the above procedure, ideal density characteristics can be obtained in a range from a low density to an intermediate density, and in the maximum density portion, an output print image ensuring solidly filled image output can be obtained. Therefore, a solidly filled thin line can be reproduced satisfactorily. Generally speaking, gradation correction using the curve 70 is suitable for graphic images.

Of course, in a case where the above-described correction table is used, since the density value obtained in practice in the maximum density portion is greater than the ideal value (here, 1.6), the density of the output image in the high density portion becomes high.

Therefore, in a case where it is desired to take priority in the ensuring of the maximum density value, a correction table may be created without checking the check box 602 of FIG. 6. For the correction table in such a case, the curve 50 of FIG. 5 is used, and the maximum density value is ensured. Generally speaking, the curve 50 is suitable for images.

In this embodiment, only in a range in which the measured density value exceeds a predetermined maximum density value, the characteristics of the correction table change depending on whether or not 255 levels should be ensured, that is, whether or not the check box 602 in FIG. 6 is checked. In the other range, the contents of the correction table are the same.

Although in this embodiment, a correction table is created so that output image data for the maximum gradation level (255) of multi-level gradation input image data reaches a maximum gradation level (255), the number of gradation levels of the input/output image data may be changed so that the a solidly filled thin line can be reproduced satisfactorily, which is an object of this embodiment. For example, a correction table may be created so that the number of gradation levels of output image data for the multi-level gradation input image data having 254 levels becomes 254.

(Second Embodiment)

In the first embodiment, a correction table corresponding to one of the curve 50 and the curve 70 is created in response to an instruction from the user, and the correction table is registered in the raster image processor.

In comparison, in this embodiment, based on the image data obtained by reading an output pattern, both of a correction table corresponding to the curve 50 and a correction table corresponding to the curve 70 are created, and these tables are registered as a correction table for images and a correction table for graphics, respectively.

A raster image processor in this embodiment determines the attribute (image, text, graphic) of an object indicated by an input command in response to the format of a command from the host computer. Then, the raster image processor performs gradation correction which is appropriate for the determination result.

As described above, since the maximum density value is ensured for the curve 50, the curve 50 is suitable for gradation correction of an image. Since a solidly filled image output is ensured for the curve 70 in a maximum density portion, the curve 70 is suitable for gradation correction of graphics and text.

Therefore, when the object indicated by the input command is an image, the raster image processor performs a gradation correction process on the object by using the correction table for images. On the other hand, when the object indicated by the input command is not an image, the raster image processor performs a gradation correction process on the object by using the correction table for graphics.

As described above, according to this embodiment, it is possible to perform gradation correction corresponding to the attribute of an object.

Furthermore, each gradation correction table can be created from the same patch pattern. That is, a plurality of gradation correction tables can be optimized without placing a significant burden on the user.

(Third Embodiment)

In the foregoing, in order to simplify the description of procedures, reading of patches for creating correction tables is performed by a conventional flatbed scanner. In addition, of course, measurements may also be performs by using a densitometer.

Figure 9A:
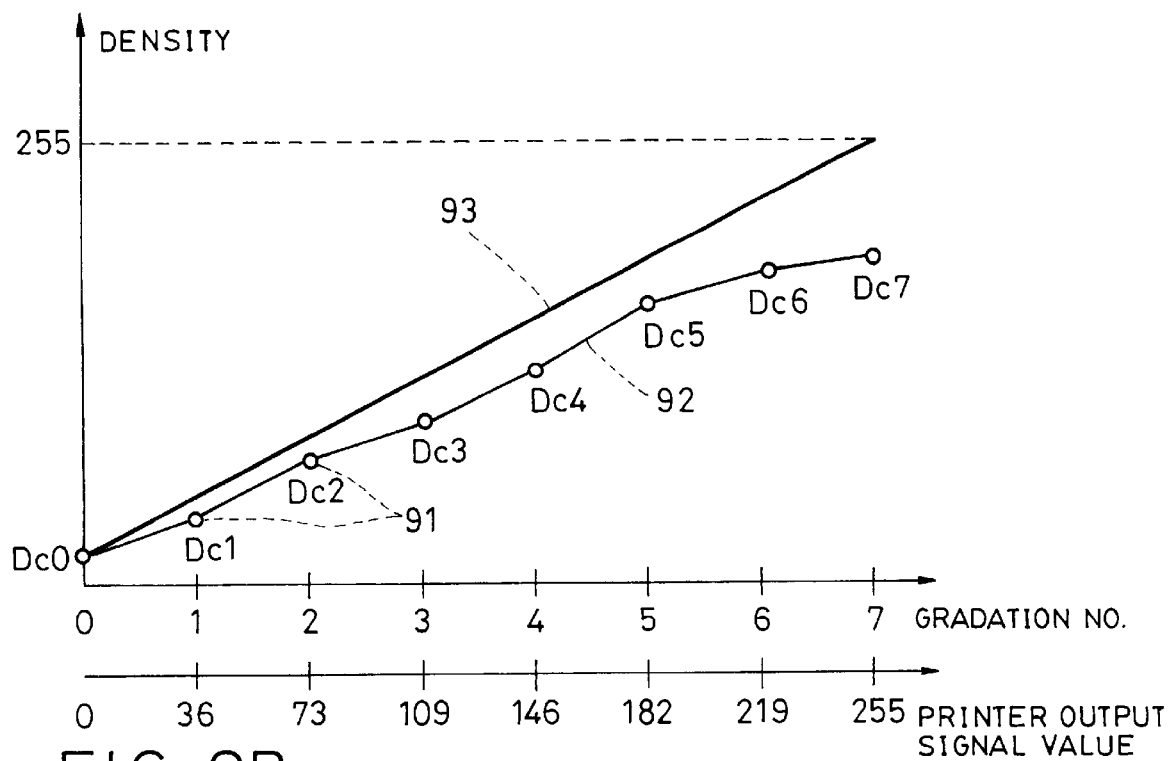
FIGS. 9A and 9B show another example of a look-up table.
Figure 9B:
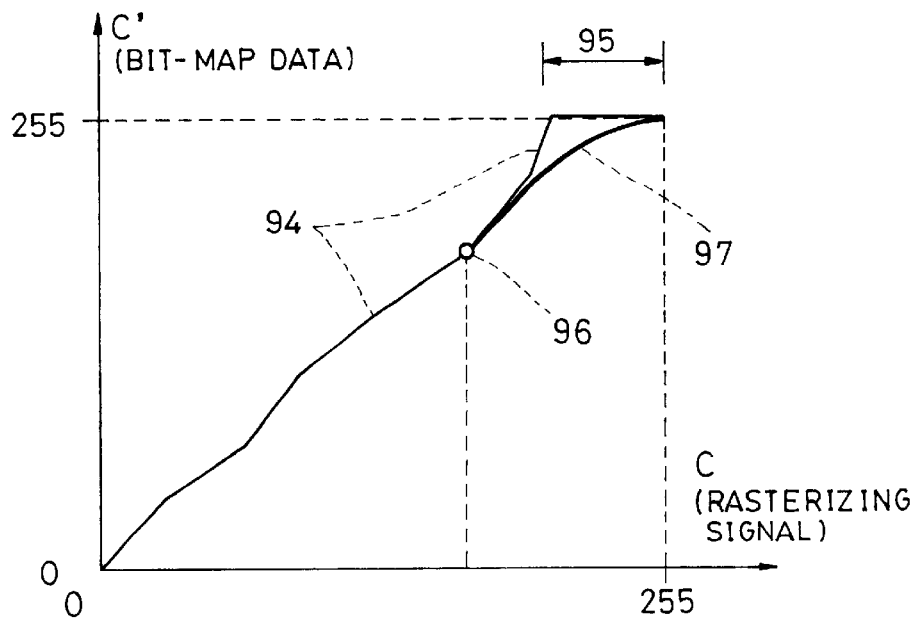

In contrast, in a case where the measured density value is smaller than a predetermined maximum density as in FIG. 9A, a correction table such as a curve 94 of FIG. 9B is created, and the gradation characteristics of the input signal in the high-density portion (range 95 in FIG. 9B) are lost. Therefore, when the maximum density value falls below a predetermined value, it is preferable that an anchor point 96 always be set so that when the input signal becomes greater than the anchor point 96, a correction table corrected by the characteristics of a curve 97 is always created. The curve 97 can be created by the same procedure as that described with reference to FIG. 8 and may be a curve which touches the curve 94 at the anchor point 96 and which gradually comes close to a value of 255.

(Other Embodiments)

Although in the above-described embodiments, the printer section and the scanner section are described as components which are separated from each other, a color copier in which these components are integrated may also be used.

Although the image forming unit is described as producing printout in accordance with an instruction from the host computer or the raster image processor, of course, the image forming unit, as a copying machine, may be applied to a system in which read signals from the scanner section are output in an image under the control of a CPU of the main unit of the copying machine.

Although the above-described embodiments assume that the printer section uses coloring materials of four C, M, Y, and K colors, the present invention can also be applied to another construction in which, for example, the printer section uses coloring materials of three C, M, and Y colors, or a single color of black.

The present invention is not limited to the above-mentioned embodiments, and various changes and modifications may be made within the scope of the appended claims.

What is claimed is:

1. An image processing method comprising the steps of:

inputting data obtained by reading a patch pattern formed by an image forming apparatus; and creating correction conditions for the image forming apparatus on the basis of the data, wherein the correction conditions are created for every attribute of an object of an image displayed by an input command based on the data obtained by reading the patch pattern so that output image data with respect to a specific gradation level of multi-level gradation input image data satisfy preset conditions.

2. An image processing method according to claim 1, wherein the input command is a PDL command transmitted from a host computer.

3. An image processing method according to claim 1, wherein the preset conditions require that the output image data with respect to the maximum gradation level of the multi-level gradation input image data has the maximum gradation level.

4. An image processing method comprising the steps of:

inputting data obtained by reading a patch pattern formed by an image forming apparatus; and creating correction conditions for the image forming apparatus on the basis of the data, wherein a plurality of methods for creating the correction conditions are provided, and the respective methods are selected based on instructions from a user, and whether or not the maximum gradation level is ensured is determined by the results of the selection.

5. An image processing apparatus comprising:

input means for inputting data obtained by reading a patch pattern formed by an image forming apparatus; and creation means for creating correction conditions for the image forming apparatus on the basis of the data, wherein said creation means creates correction conditions for every attribute of an object of an image displayed by an input command on the basis of the data obtained by reading the patch pattern so that output image data with respect to a specific gradation level of multi-level gradation input image data satisfy preset conditions.

6. A computer-readable recording medium having recorded therein a program for implementing an image processing method, said image processing method comprising the steps of:

inputting data obtained by reading a patch pattern formed by an image forming apparatus; and creating correction conditions for the image forming apparatus on the basis of the data, wherein the correction conditions are created for every attribute of an object of an image displayed by an input command based on the data obtained by reading the patch pattern so that output image data with respect to a specific gradation level of multi-level gradation input image data satisfy preset conditions.

7. An image processing apparatus comprising:

input means for inputting data obtained by reading a patch pattern formed by an image forming apparatus; and creation means for creating correction conditions for the image forming apparatus on the basis of the data, wherein a plurality of methods for creating the correction conditions are provided, and the respective methods are selected based on instructions from a user, and whether or not the maximum gradation level is ensured is determined by the results of the selection.

8. A computer-readable recording medium having recorded therein a program for implementing an image processing method, said image processing method comprising the steps of:

inputting data obtained by reading a patch pattern formed by an image forming apparatus; and creating correction conditions for the image forming apparatus on the basis of the data, wherein a plurality of methods for creating the correction conditions are provided, and the respective methods are selected based on instructions from a user, and whether or not the maximum gradation level is ensured is determined by the results of the selection.

* * * * *

UNITED STATES PATENT AND TRADEMARK OFFICE
CERTIFICATE OF CORRECTION

PATENT NO. : 6,714,673 B1
DATED : March 30, 2004
INVENTOR(S) : Ken-ichi Ohta

It is certified that error appears in the above-identified patent and that said Letters Patent is hereby corrected as shown below:

Title page,
Item [56], References Cited, FOREIGN PATENT DOCUMENTS,
"77-333930" should read -- 7-333930 --.

Drawings,
Figure 11, "RECTANGULE/COLOR" should read -- RECTANGLE/COLOR --.

Column 7,
Line 18, "SC1B," should read -- Sc1B, --.

Column 10,
Line 26, "the" should be deleted.

Column 11,
Line 5, "performs" should read -- performed --.

Signed and Sealed this

Twenty-eighth Day of February, 2006

JON W. DUDAS
*Director of the United States Patent and Trademark Office*